United States Patent
Lim et al.

(10) Patent No.: US 10,915,993 B2
(45) Date of Patent: Feb. 9, 2021

(54) DISPLAY APPARATUS AND IMAGE PROCESSING METHOD THEREOF

(71) Applicant: SAMSUNG ELECTRONICS CO., LTD., Suwon-si (KR)

(72) Inventors: Kyung-Min Lim, Seoul (KR); Jae-Sung Lee, Seoul (KR); Tammy Lee, Seoul (KR); Chang-Han Kim, Goyang-si (KR); Eun-Young Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/342,047

(22) PCT Filed: Oct. 20, 2017

(86) PCT No.: PCT/KR2017/011676
§ 371 (c)(1),
(2) Date: Apr. 15, 2019

(87) PCT Pub. No.: WO2018/074893
PCT Pub. Date: Apr. 26, 2018

(65) Prior Publication Data
US 2019/0251672 A1    Aug. 15, 2019

(30) Foreign Application Priority Data
Oct. 20, 2016  (KR) .................. 10-2016-0136528

(51) Int. Cl.
G06T 5/00   (2006.01)
H04N 5/232  (2006.01)
G06T 7/246  (2017.01)
G06T 3/20   (2006.01)

(52) U.S. Cl.
CPC ............. G06T 5/003 (2013.01); G06T 3/20 (2013.01); G06T 7/248 (2017.01);
(Continued)

(58) Field of Classification Search
None
See application file for complete search history.

(56) References Cited

U.S. PATENT DOCUMENTS 10,108,018 B2   10/2018  Takahashi et al.
2008/0309772 A1*  12/2008  Ikeda ............ G03B 5/00
                                                348/208.7
(Continued)

FOREIGN PATENT DOCUMENTS

JP    2004-233882 A    8/2004
JP    2005-295495 A   10/2005
(Continued)

OTHER PUBLICATIONS

International Search Report (PCT/ISA/210) dated Feb. 5, 2018 issued by the International Searching Authority in International Application No. PCT/KR2017/011676.
(Continued)

*Primary Examiner* — Ke Xiao
*Assistant Examiner* — Jed-Justin Imperial
(74) *Attorney, Agent, or Firm* — Sughrue Mion, PLLC

(57) ABSTRACT

An image processing method of a display apparatus is disclosed. The image processing method includes analyzing a plurality of image frames constituting a virtual reality image and determining shake information of a camera which photographs the VR image, calculating a shake correction value of an image corresponding to a viewing area of a user from the VR image based on the shake information of the camera, and adjusting the viewing area based on the shake correction value and displaying an image corresponding to the adjusted viewing area in the VR image.

11 Claims, 15 Drawing Sheets

(52) U.S. Cl.
CPC ..... *H04N 5/23254* (2013.01); *H04N 5/23293* (2013.01); *G06T 2200/24* (2013.01); *G06T 2207/20201* (2013.01)

(56) References Cited

U.S. PATENT DOCUMENTS

| | | |
|---|---|---|
| 2010/0103104 A1 | 4/2010 | Son et al. |
| 2010/0149352 A1* | 6/2010 | Jang ................... H04N 5/23248 348/208.11 |
| 2014/0313354 A1* | 10/2014 | Kusanagi ........... H04N 5/23267 348/208.6 |
| 2015/0022677 A1 | 1/2015 | Guo et al. |
| 2015/0293362 A1* | 10/2015 | Takahashi ............... G06F 3/147 348/47 |
| 2015/0310665 A1 | 10/2015 | Michail et al. |
| 2016/0191945 A1 | 6/2016 | Gurbuz |

FOREIGN PATENT DOCUMENTS

| | | |
|---|---|---|
| JP | 2014-11624 A | 1/2014 |
| KR | 10-2010-0047793 A | 5/2010 |
| WO | 2014/077046 A | 2/2018 |

OTHER PUBLICATIONS

Written Opinion (PCT/ISA/237) dated Feb. 5, 2018 issued by the International Searching Authority in International Application No. PCT/KR2017/011676.

\* cited by examiner (a)

(b)

(a) (b) (c)

<X-DIRECTION MOVEMENT
COMPONENT ANALYSIS>

FRONT: Front_x = Tx + yaw
BACK: Back_x = -Tx + yaw
LEFT: Left_x = Tz + yaw
RIGHT: Right_x = -Tz + yaw <Y-DIRECTION MOVEMENT
COMPONENT ANALYSIS>

FRONT: Front_y = Ty + pitch ~41
BACK: Back_y = Ty - pitch ~42
LEFT: Left_y = Ty + roll ~43
RIGHT: Right_y = Ty - roll ~44

(a)

(b)

(a)

(b)

(a)

(b)

(a)

(b)

(c)

DISPLAY APPARATUS AND IMAGE PROCESSING METHOD THEREOF

TECHNICAL FIELD

This disclosure relates to a display apparatus and an image processing method thereof and, more particularly, to a display apparatus displaying a virtual reality (VR) image and an image processing method of the display apparatus.

BACKGROUND ART

Recently, a market of an immersion display having a large field of view (FOV) such as a head mounted device (HMD) is rapidly growing.

The HMD is a device worn on the head of a user to display an image. As a display is disposed close to the eyes of a person wearing the HMD, this device is also called a face mounted display (FMD). The HMD may implement visual virtual reality by displaying VR image contents such as 360-degree video contents.

For example, by wearing the HMD for displaying VR image contents and facing a desired direction, a user may view the video of an area which the user wishes to view in the entire VR image as if it is a real environment, thereby being able to receive a feeling that the user is actually present in the virtual space.

The VR image contents are produced through a separate camera for producing VR image contents such as a 360-degree camera rather than a general camera. Recently, a 360-degree camera for a personal use is distributed and an individual may produce the VR contents.

In the meantime, when the image contents are produced through a camera, when the image is photographed in a photographing environment (for example, photographing on a ride) in which there is a camera shake or hand shake of a user holding the camera, the shake of the camera is reflected into the photographed image.

At this time, since various types of anti-shake (or anti-hand shake) techniques are applied to a general camera, image contents with camera shake correction at the time of photographing may be produced.

In contrast, a 360-degree camera is not applied with the anti-shake technology, which is problematic. In other words, when the VR image contents produced through the 360-degree camera are viewed by the immersion display apparatus such as the HMD, a user feels fatigue and burdens in the eyes due to shake of the image. Particularly, since the person wearing the HMD views an image through the entire field of view, the shake of the VR image is more problematic than when a general image is viewed.

DISCLOSURE

Technical Problem

The disclosure provides a display apparatus capable of displaying a virtual reality (VI) image with reduced shake, and an image processing method thereof.

Technical Solution

According to an embodiment of the disclosure, an image processing method of the display apparatus includes analyzing a plurality of image frames constituting a virtual reality image and determining shake information of a camera which photographs the VR image, calculating a shake correction value of an image corresponding to a viewing area of a user from the VR image based on the shake information of the camera, and adjusting the viewing area based on the shake correction value and displaying an image corresponding to the adjusted viewing area in the VR image.

The determining shake information of a camera may include dividing each of the plurality of image frames into a plurality of areas and detecting feature points by areas which correspond to each other in the plurality of image frames, and determining shake information of the camera based on a change amount between the detected feature points.

The shake information of the camera may include at least one of movement information of the camera in an X-axis, movement information in a Y-axis, movement information in a Z-axis, yaw rotation movement information, pitch rotation movement information, and roll rotation movement information, with respect to a preset direction.

The calculating the shake correction value may include converting the shake information of the camera into shake information of the image corresponding to the viewing area based on a movement state of the display apparatus which determines the viewing area, and calculating the shake correction value using shake information of the image corresponding to the viewing area.

The calculating the shake correction value may include smoothing the shake information of the image, calculating a difference value between the shake information of the image and the smoothed shake information of the image, and calculating the shake correction value by converting the difference value to a rotation value of a sphere.

The shake information of the image may be two-axis shake information including x-axis shake information and y-axis shake information corresponding to the viewing area or three-axis shake information including x-axis shake information, y-axis shake information, and rotation shake information of the image corresponding to the viewing area.

The displaying may include adjusting the viewing area by moving the viewing area as much as the shake correction value in the VR image, and displaying the image corresponding to the moved viewing area.

The determining the shake information may include determining the shake information using an analysis result of the plurality of image frames and shake information obtained through a sensor included in the camera.

The method may further include displaying a UI for executing a shake correction mode to correct shake of the image corresponding to the viewing area of the user, and the calculating the shake correction value may include, based on the shake correction mode being executed, calculating the shake correction value.

The method may further include displaying a UI for adjusting a shake correction degree to adjust shake correction degree of the image corresponding to the viewing area of the user, and the smoothing may include adjusting a smoothing intensity of shake information of the image according to a user manipulation through the UI for adjusting a shake correction degree.

According to an embodiment, a display apparatus includes a display configured to display an image corresponding to a viewing area of a user in a VR image, and a processor configured to analyze a plurality of image frames constituting the VR image and determine shake information of a camera which photographs the VR image, calculate a shake correction value of an image corresponding to the viewing area based on shake information of the camera, adjust the viewing area based on the shake correction value, and control the display an image corresponding to the adjusted viewing area in the VR image.

The processor may divide each of the plurality of image frames into a plurality of areas, detects feature points by areas which correspond to each other in the plurality of image frames, and determine shake information of the camera based on a change amount between the detected feature points.

The shake information of the camera may include at least one of movement information of the camera in an X-axis, movement information in a Y-axis, movement information in a Z-axis, yaw rotation movement information, pitch rotation movement information, and roll rotation movement information, with respect to a preset direction.

The processor may convert the shake information of the camera into shake information of the image corresponding to the viewing area based on a movement state of the display apparatus which determines the viewing area, and calculate the shake correction value using shake information of the image corresponding to the viewing area.

The processor may smooth the shake information of the image, calculate a difference value between the shake information of the image and the smoothed shake information of the image, and calculate the shake correction value by converting the difference value to a rotation value of a sphere.

The shake information of the image may be two-axis shake information including x-axis shake information and y-axis shake information corresponding to the viewing area or three-axis shake information including x-axis shake information, y-axis shake information, and rotation shake information of the image corresponding to the viewing area.

The display may adjust the viewing area by moving the viewing area as much as the shake correction value in the VR image, and control the display to display the image corresponding to the moved viewing area.

The processor may determine the shake information using an analysis result of the plurality of image frames and shake information obtained through a sensor included in the camera.

The processor may control the display to display a UI for executing a shake correction mode to correct shake of the image corresponding to the viewing area of the user, and if the shake correction mode is executed, calculate the shake correction value.

The processor may control the display to display a UI for adjusting a shake correction degree to adjust shake correction degree of the image corresponding to the viewing area of the user, and adjust a smoothing intensity of shake information of the image according to a user manipulation through the UI for adjusting a shake correction degree.

The processor may convert the shake information of the camera to two-axis shake information of the image corresponding to the viewing area based on the motion state of the display apparatus and calculate the shake correction value using the two-axis shake information of the image corresponding to the viewing area.

In addition, the two-axis shake information may include x-axis and y-axis displacement values among a plurality of frames representing the image corresponding to the viewing area and the processor may smooth the two-axis shake information, calculate a difference value between the smoothed two-axis shake information and the two-axis shake information, and convert the difference value to a rotation value of a sphere to calculate the shake correction value.

The processor may adjust the viewing area by moving the viewing area in the VR image as much as the shake correction value and control the display to display the image corresponding to the moved viewing area.

The processor may determine the shake information using the analysis result of the plurality of image frames and shake information obtained through a sensor included in the camera.

The processor may control the display to display a UI for executing the shake correction mode to correct shake of the image corresponding to the viewing area of the user and when the shake correction mode is executed, calculate the shake correction value.

The processor may control the display to display a UI for adjusting the shake correction degree to adjust shake correction degree of the image corresponding to the viewing area of the user and adjust smoothing intensity of the two-axis shake information according to the user manipulation through the UI for adjusting the shake correction degree.

A computer-readable recording medium including a program for executing an image processing method of the display apparatus according to an embodiment includes the image processing method of the display apparatus which includes analyzing a plurality of image frames constituting a virtual reality image and determining shake information of a camera which photographs the VR image; calculating a shake correction value of an image corresponding to a viewing area of a user from the VR image based on the shake information of the camera; and adjusting the viewing area based on the shake correction value and displaying an image corresponding to the adjusted viewing area in the VR image.

Effect of Invention

According to various embodiments as described above, the display apparatus may display a VR image with reduced shake.

DETAILED DESCRIPTION OF EXEMPLARY EMBODIMENTS

In describing the disclosure, a detailed description of the related art is omitted when it is determined that the detailed description may unnecessarily obscure the gist of the disclosure. In addition, the suffix "part" for a component used in the following description is given or used in consideration of the ease of writing the specification, and does not have a distinct meaning or role as it is.

The terms used in the description are used to describe an embodiment, but may not intend to limit the scope of other embodiments. Unless otherwise defined specifically, a singular expression may encompass a plural expression.

It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, in an embodiment, when any part is connected to another part, this includes a direct connection and an indirect connection through another medium. Further, when a certain portion includes a certain element, unless specified to the contrary, this means that another element may be additionally included, rather than precluding another element.

Figure 1:
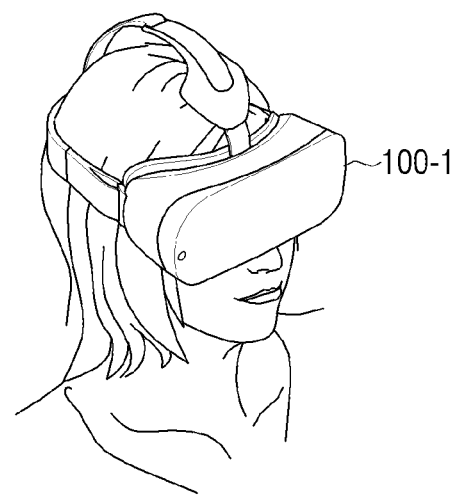
FIG. 1 is an exemplary view of a display apparatus according to various embodiments.
Figure 1:
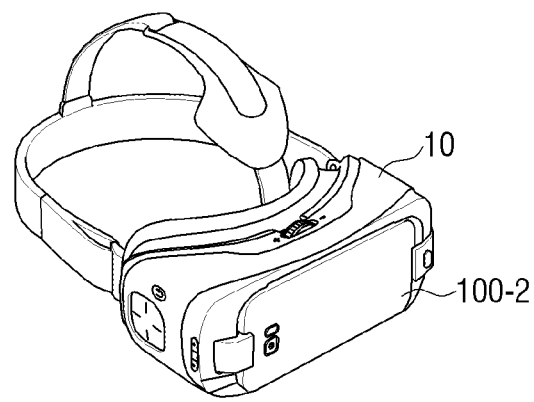

Various embodiments will be described in greater detail with reference to the attached drawings. FIG. 1 is a view illustrating an implementation format and appearance of the display apparatus according to an embodiment.

The display apparatus according to the embodiments of the disclosure may be implemented as an integrated HMD in which a band for wearing the HMD on the user's head, various user input interfaces for controlling the operation of the HMD, and a display are composed in one device, or implemented as a display apparatus in a form of providing display by being coupled to a detachable HMD without the display.

FIG. 1A illustrates that a user wears a display apparatus 100-1 which is implemented as the integrated HMD on the head. As illustrated in FIG. 1A, the display apparatus 100-1 may include a band for fixing the display apparatus 100-1 on the head of the user, and the HMD itself includes a display.

According to one embodiment of the disclosure, the integrated HMD-type display apparatus 100-1 may be connected to an external device such as a notebook and a personal computer (PC) and display the VR image which is processed in a way to be described later and provided by the external device.

According to another embodiment of the disclosure, the integrated HMD-type display apparatus 100-1 may include a storage (not shown) for storing the VR image or a communicator (not shown) for receiving the VR image as streaming, and a processor (not shown) capable of processing the VR image and may be operated in a stand-alone format.

At this time, when the display apparatus 100-1 is connected to the notebook or the PC and operated, the display apparatus 100-1 according to the embodiment of the disclosure may include the notebook or PC connected to the display apparatus 100-1.

FIG. 1B illustrates an example of a display apparatus 100-2 implemented to be used in combination with a detachable HMD. As shown in FIG. 1B, the display apparatus 100-2 may be implemented as a smartphone and may be coupled to a body 10 of the HMD to provide a display.

In the meantime, the display apparatus 100-2 used in combination with the detachable HMD is not limited to a smart phone, and may be implemented as various types of display apparatuses including a display such as a tablet PC, a mobile phone, an E-book reader, a personal digital assistant (PDA), a portable multimedia player (PMP), an MP3 player, a navigation device, a digital camera, or the like.

Hereinbelow, the display apparatuses 100-1 and 100-2 may mean the integrated HMD 100-1, or the display apparatus 100-2 which is used in combination with a detachable HMD.

A user may wear such display apparatuses 100-1 and 100-2 and view the VR image. FIG. 2 is a view illustrating an example of the VR image and a situation in which a user views the VR image.

Figure 2A:
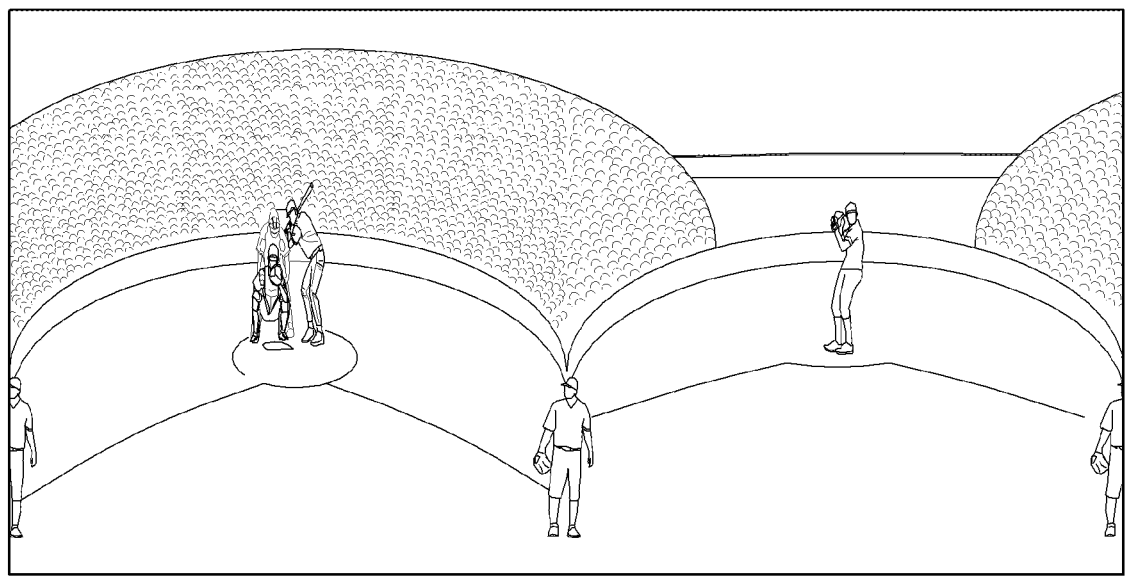
FIG. 2A is an exemplary view of a VR image and a user viewing the VR image.

The VR image may be a panoramic image or a 360-degree image capable of securing a 360-degree view, and may be an image filmed by a 360-degree camera, but is not limited thereto. FIG. 2A is an example of the VR image in an Equirectangular Projection (ERP) format. As illustrated in FIG. 2A, the VR image may include 360-degree view of front, back, left, and right based on a specific location (e.g., a front) of the camera at the time of photographing.

The VR image may be generated by photographing different directions using a 360-degree camera including a plurality of photographing units and stitching the photographed images. However, the embodiment is not limited thereto, and the details of the 360-degree camera generating the VR image are beyond the scope of the disclosure, and a detailed description thereof will be omitted.

In the meantime, when the user wears the display apparatuses 100-1 and 100-2 and views the VR image, the user does not see the entire VR image as shown in FIG. 2A, that is, the entire 360-degree video, but may view a video of a part of the image corresponding to the view of the user, from among the entire VR image, and the user may view the image of other areas by moving the head.

Figure 2B:
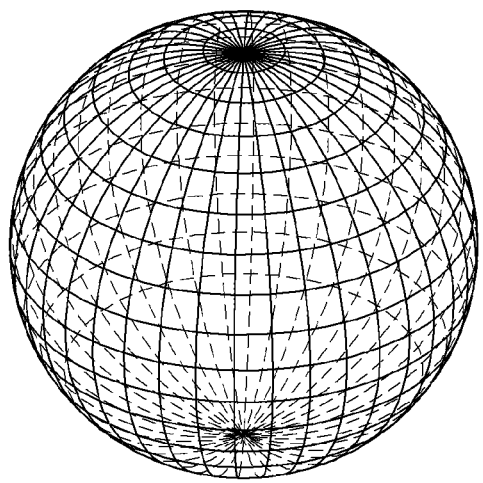
FIG. 2B is an exemplary view of a VR image and a user viewing the VR image.

In other words, when viewed from the position of a user wearing the display apparatuses 100-1 and 100-2, the VR image as shown in FIG. 2A is worn on a spherical shape as shown in FIG. 2B, and the user may feel as if the user is located at the center of the sphere and views the VR image in a specific direction.

At this time, the display apparatuses 100-1 and 100-2 may display an area which corresponds to the FOV of a person with respect to a direction which a user views in the entire VR image, and when the user moves his or her head, the display apparatuses detect the head movement and display the image of the changed position as much as the detected movement, and the user may feel as if the user is in the real world.

Here, a part of the entire area of the VR image which is viewed by the user is referred to as a viewing area of a user, and if the user moves the head in another direction, the viewing area of the user may change accordingly. At this time, the display apparatuses 100-1 and 100-2 may display an image of an area corresponding to the viewing area of a user in the VR image.

Figure 2C:
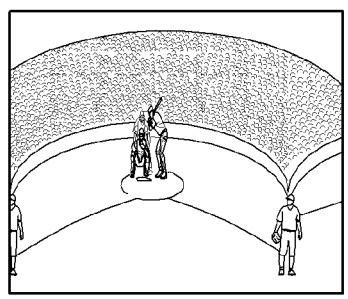
FIG. 2C is an exemplary view of a VR image and a user viewing the VR image.
Figure 2C:
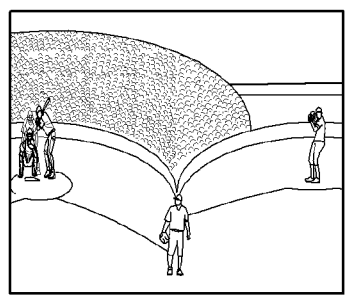
Figure 2C:
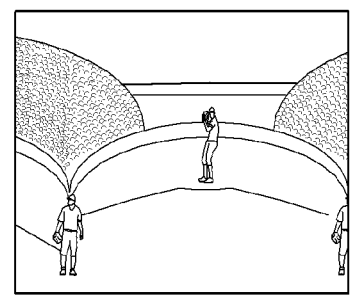
Figure 2C:
Figure 2C:
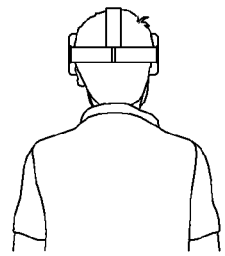
Figure 2C:
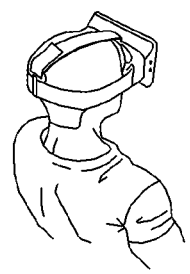

That is, for example, as shown in FIG. 2C (B), when the user wears the display apparatuses 100-1 and 100-2 and faces the front, the display apparatuses 100-1 and 100-2 may display an image of an area corresponding to the user's FOV, centering on the front portion of the VR image as illustrated in FIG. 2A, and when the user turns his or her head to the left, as shown in FIG. 2C (A), the image in the area corresponding to the FOV centering on the left portion of the VR image of FIG. 2A, and when the user turns head to the right side, as shown in FIG. 2C (C), an image of the area corresponding to the FOV of the user centering on the right portion of the VR image of FIG. 2A may be displayed.

As described above, a viewing area may change continuously according to a head movement in front, back, left, right, up, and down directions, and the display apparatuses 100-1 and 100-2 may display an image corresponding to the changed viewing area.

Meanwhile, as described above, it is ordinary that anti-shaking technology is applied to the 360-degree camera and thus, when the VR image is produced, that is, if there is shake of camera when the VR image is photographed through the 360-degree camera, the shaking or vibration of the camera is reflected in the VR image, and viewing such VR image with shake causes a user to have fatigue or burdens in the eyes.

Particularly, when the VR image is viewed through the HMD, the HMD is worn in the head of the user for feeling of high immersion and reality and blocks FOV toward an outside. Therefore, fatigue to the eyes of the user due to shake of an image is a big problem than viewing an ordinary image.

Therefore, according to one embodiment of the disclosure, the display apparatuses 100-1 and 100-2 may analyze the VR image to be displayed, determine the shake information of the camera which photographs the VR image, calculate a shake correction value of the image corresponding to the current viewing area of the user using the determined camera shake information, and display an image corresponding to the viewing area which is adjusted as much as the calculated shake correction value. Therefore, the user may view a VR image with reduced shake.

Figure 3:
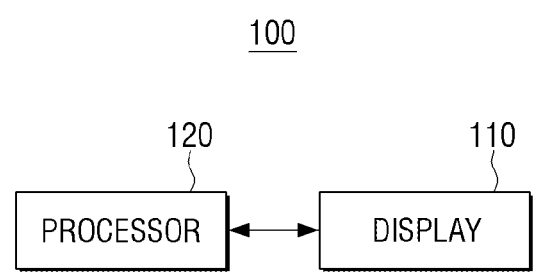
FIG. 3 is a block diagram of a display apparatus according to an embodiment.

FIG. 3 is an exemplary view of the display apparatus according to an embodiment. According to FIG. 3, the display apparatus 100 includes a display 110 and a processor 120.

The display 110 may display various images. Here, the images may represent images in various formats such as a text, a still image, a moving image, a graphic user interface (GUI), or the like.

In particular, the display 110 may display the VR image, and at this time, the VR image may be a moving image or an image including a plurality of still images which are consecutively photographed by a predetermined number of times. According to an embodiment of the disclosure, the display 110 may display an image corresponding to a viewing area of the user in the VR image by receiving the control of the processor 120.

For this purpose, the display 110 may be implemented as various types of displays such as a liquid crystal display (LCD), organic light emitting diodes (OLED), active-matrix organic light-emitting diode (AM-OLED), plasma display panel (PDP), or the like.

The processor 120 controls the overall operation of the display apparatus 100. In particular, the processor 120 may analyze a plurality of image frames constituting the VR image to determine shake information of the camera photographing the VR image.

Since the VR image includes a moving image or a plurality of still images photographed consecutively, the VR image may include a plurality of image frames according to the flow of time. Therefore, the processor 120 may analyze the plurality of image frames and determine shake information of the camera photographing the VR image. At this time, the analyzed VR image may be an Equirectangular projection (ERP) format, but is not limited thereto, and may be an image of a different format that is expressed by converting an actual external environment of a spherical shape surrounding the camera photographing the VR image into a rectangular shape as shown in FIG. 2A.

Specifically, the processor 120 may divide each of a plurality of image frames constituting the VR image into a plurality of areas to detect feature points in areas corresponding to each other, and determine the shake information of the camera based on the changes in the detected feature points.

For example, the processor 120 may divide each of the plurality of image frames into a plurality of areas, such as front, back, left, and right, based on the photographing direction of the camera. In addition, the processor 120 may detect feature points for each divided area for each of the plurality of image frames. The specific method for detecting the feature points in an image is not related to the gist of the disclosure, and thus a detailed description thereof is omitted.

Accordingly, the processor 120 may calculate changed amount of feature points between a plurality of frames by divided areas, for example, a movement vector, and determine the shake information of the camera photographing the VR image based on the movement vector. In this case, the plurality of image frames may be two consecutive image frames, but it is not limited thereto, and may be a plurality of image frames selected in a unit of the predetermined number of frames.

Figure 4A:
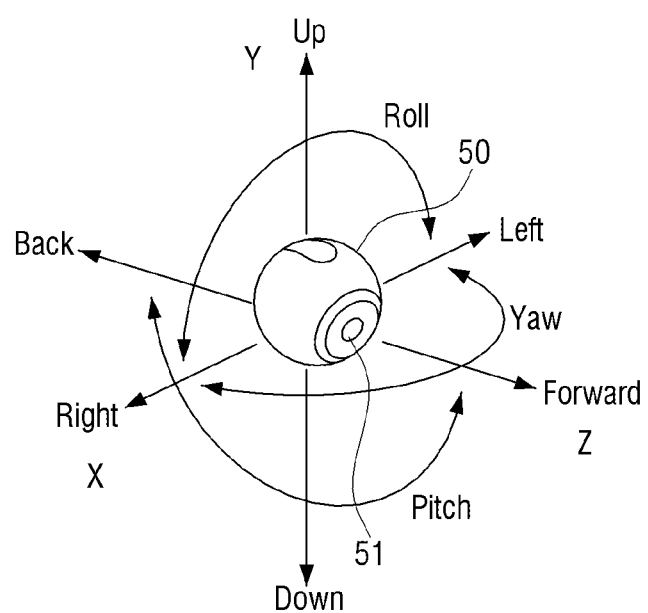
FIG. 4A is a view to describe a method for determining shake information of a camera according to an embodiment.
Figure 4B:
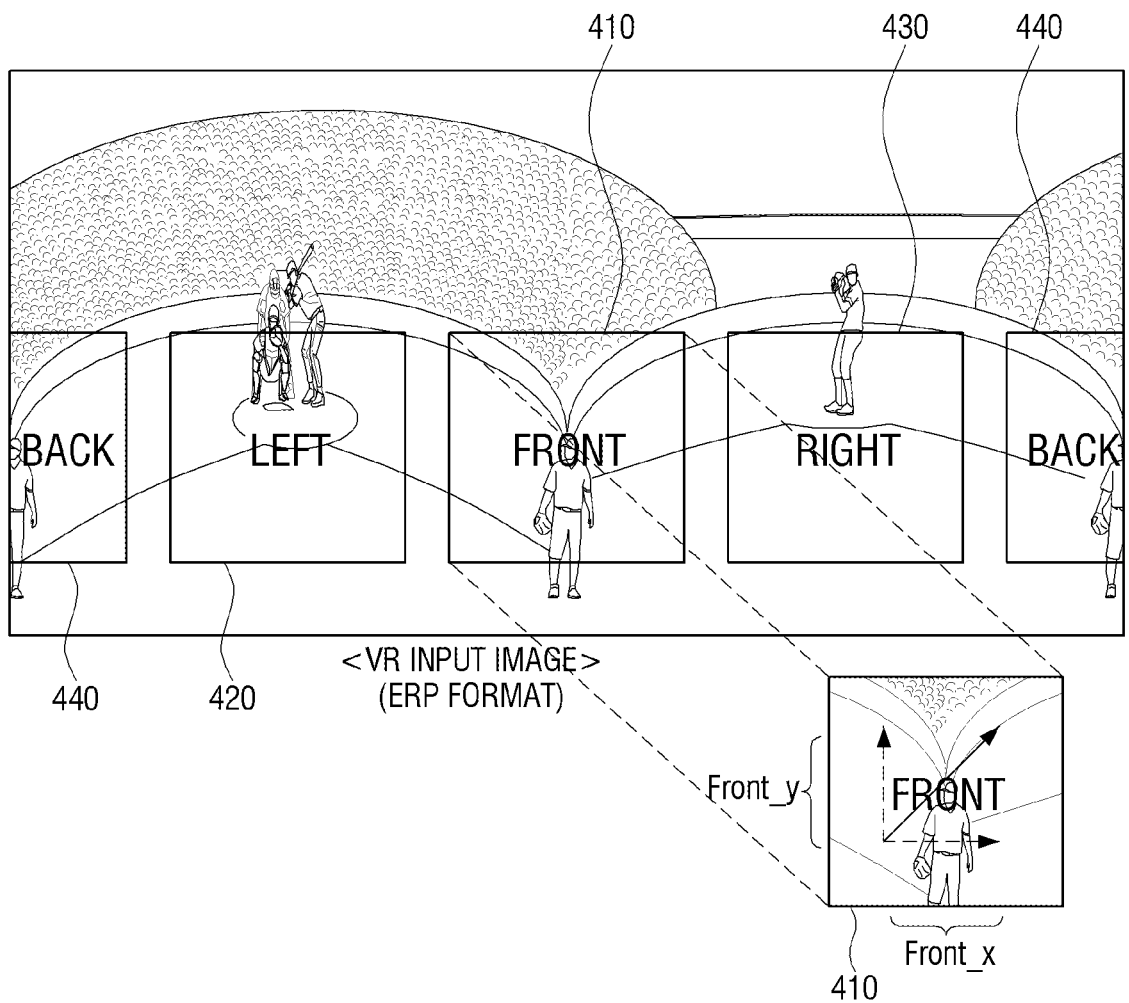
FIG. 4B is a view to describe a method for determining shake information of a camera according to an embodiment.

FIGS. 4A and 4B are views to describe a method for determining shake information of a camera according to an embodiment. As shown in FIG. 4A, shake of a camera 50 photographing VR image may have six movement components. Specifically, movement components of the camera 50 may include the movement information in the x-axis direction, movement information in the y-axis direction, movement information in the z-axis direction, and yaw rotation movement information, pitch rotation movement information, and roll rotation movement information with respect to a front photographing unit 51.

In order to determine the shake information of the camera 50, the processor 120 may analyze the VR image of the ERP format as shown in FIG. 4B. Though one VR image frame is illustrated in FIG. 4B, the VR image includes a plurality of image frames as described above.

Specifically, the processor 120 may divide each of the plurality of image frames constituting the VR image into four areas such as front 410, back 440, left 420, and right 430, analyze movement of the image between image frames by the divided four areas and determine the shake information of the camera 50.

For example, the x-axis movement of an image in the front area 410 includes the x-axis direction linear movement of the camera 50 and yaw rotation movement component of the camera 50, and the y-axis direction movement of the image in the first area 410 includes the y-axis direction linear movement and the pitch rotation movement component of the camera 50. Therefore, the processor 120 may represent the x-direction movement component (Front_x) and the y-axis movement component (Front_y) between the image frames, with respect to the front area 410, as specified in the equation 41 of FIG. 4B below.

As for the remaining areas 420, 430, and 440 as well, the x-direction movement and the y-direction movement may be analyzed and illustrated as the equations 42, 43, and 44 of FIG. 4B.

Accordingly, the processor 120 may determine the shake information of the camera 50 including six movement information through the equations as shown below.

$$yaw = (Front\_x + Back\_x + Left\_x + Right\_x)/4$$

$$Tx = (Front\_x - Back\_x)/2$$

$$Tz = (Left\_x - Right\_x)/2$$

$$Ty = (Front\_y + Back\_y + Left\_y + Right\_y)/4$$

$$pitch = (Front\_y - Back\_y)/2$$

$$roll = (Left\_y - Right\_y)/2 \qquad [\text{Equation 1}]$$

Here, Tx represents the x-axis linear movement information of the camera 50, Ty is the y-axis linear movement information of the camera 50, Tz is the z-axis linear movement information of the camera 50, yaw is yaw rotation movement information of the camera 50, pitch is pitch rotation movement information of the camera 50, and roll is roll rotation movement information of the camera 50. In addition, Front_x, Front_y, Back_x, Back_y, Left_x, Left_y, Right_x, and Right_y represent x-axis and y-axis movement components for the front, back, left and right areas 410, 440, 420, and 430 of the VR image.

As described above, the processor 120 may determine the shake information of the camera photographing the VR image by analyzing the VR image.

However, FIG. 4 is only an example, and an example of analyzing the VR image and determining the shake information of the camera is not limited thereto. For example, the processor 120 may divide a plurality of image frames constituting the VR image into less than four areas or at least five areas, and analyze the shake information of the camera 50 through another equation by analyzing the movement components of images between image frames by the divided areas.

In the meantime, the processor 120 may calculate a correction value of the shake of the image corresponding to the viewing area based on the determined shake information of the camera.

When the user wears the display apparatuses 100, 100-1, 100-2 and views the VR images, only the images corresponding to the viewing areas of the user are displayed on the display apparatuses 100, 100-1, 100-2, and the shake information of the camera determined as described above is reflected differently in the viewing area of the user. Therefore, the processor 120 needs to convert shake information of the camera into shake information of the image corresponding to the viewing area of the user.

Figure 5A:
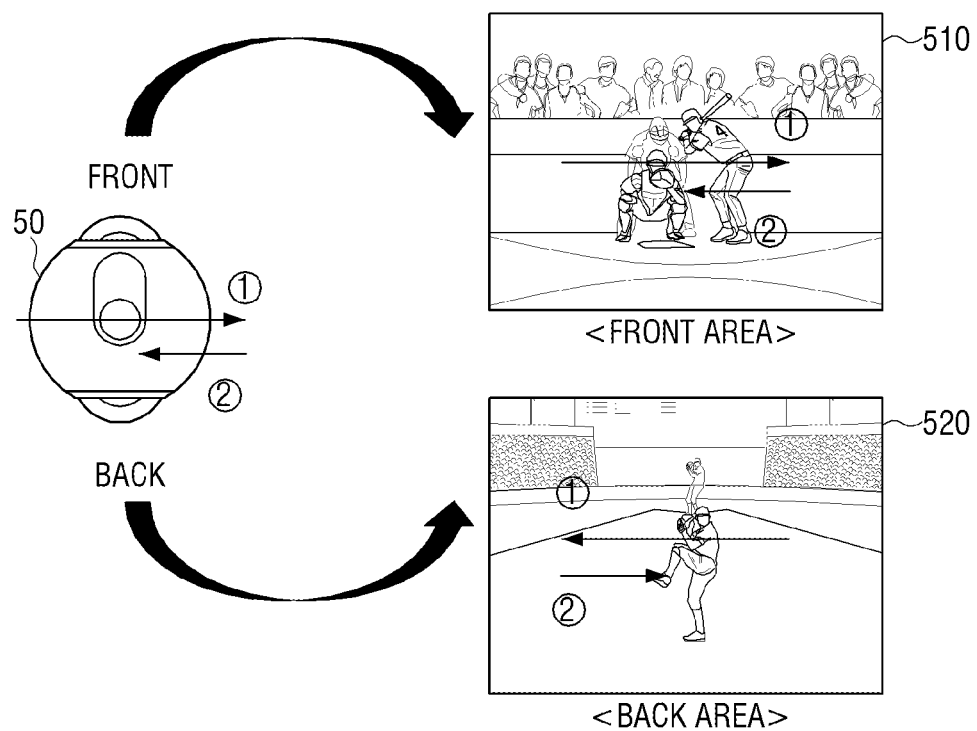
FIG. 5A is a view to describe a method for calculating a shake correction value according to an embodiment.

FIG. 5A illustrates an example that shake information of the camera is reflected differently to each of the viewing area of the user. As illustrated in FIG. 5A, when the camera 50 photographing the VR image is shaken to the left (②) and right (①) with respect to the x-axis, it is seen that shake of the camera 50 in an image 510 corresponding to the front area of the camera 50 and in an image 520 corresponding to the back area, among the VR images, have opposite influences. FIG. 5A illustrates comparison of images corresponding to the front area and the back area of the camera 50 in the VR image for convenient description, but it is obvious that shake of the camera 50 having six movement components will affect arbitrary viewing areas such as left, right, up, down of the VR image differently.

At this time, the six movement components of the camera 50 may be represented as at least one of x-axis shake, y-axis shake, and rotation shake of an image corresponding to an arbitrary viewing area among the entire VR images. Here, the x-axis shake refers to a left and right shake of an image corresponding to the viewing area, and the y-axis shake refers to an upward and downward shake of an image corresponding to the viewing area. The rotation shake of an image corresponding to the viewing area may mean a shake in which the image rotates clockwise or counterclockwise with respect to the center of the viewing area.

Accordingly, the processor 120 may convert the camera shake information into shake information of the image corresponding to the viewing area of the user, and calculate the shake correction value using the shake information. Specifically, based on the motion state of the display apparatus 100 that determines the viewing area of the user, the processor 120 may convert the camera shake information into two-axis shake information or three-axis shake information of the image corresponding to the viewing area of the user.

Here, the two-axis shake information refers to x-axis shake information and y-axis shake information of the image corresponding to the viewing area of the user, the three-axis shake information may refer to x-axis shake information, y-axis shake information, and rotation shake information of the image corresponding to the viewing area of the user.

As described above, when the person wearing the display apparatus 100 turns head, the display apparatus 100 may detect this and display an image corresponding to the changed viewing area as the user moves head. That is, when the user moves the head while wearing the display apparatus 100, the display apparatus 100 moves as well and thus, the display apparatus 100 may detect the motion state of the display apparatus 100 through various sensors and determine a viewing area of the user. At this time, the viewing area of the user may be represented by spherical coordinate values such as yaw, pitch, and roll values for a reference point (for example, a point of the VR image corresponding to the front center portion of the camera 50), but is not limited thereto.

Accordingly, the processor 120 may convert the camera shake information into two-axis shake information or three-axis shake information of the image corresponding to the viewing area of the user.

Figure 5B:
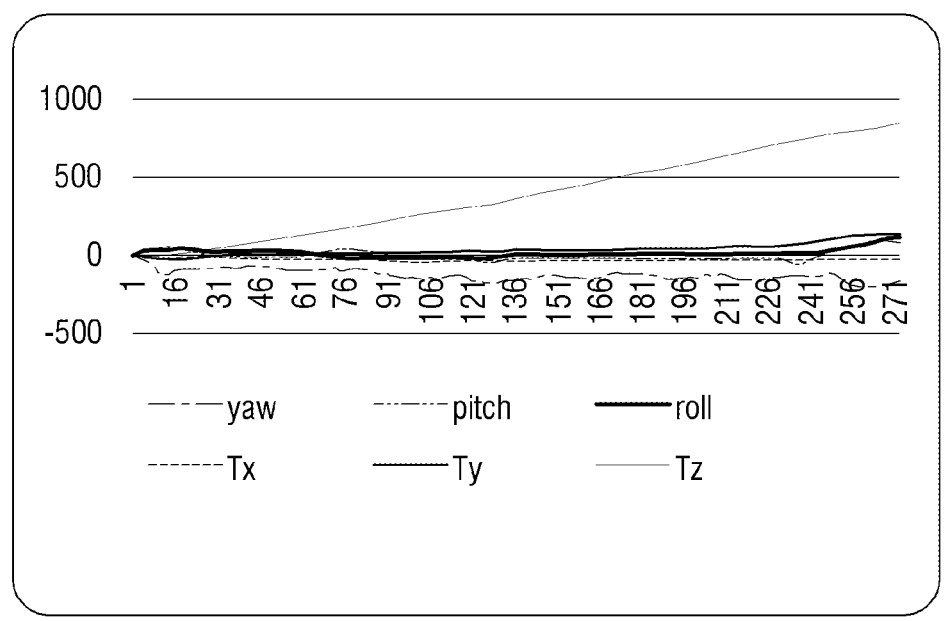
FIG. 5B is a view to describe a method for calculating a shake correction value according to an embodiment.
Figure 5C:
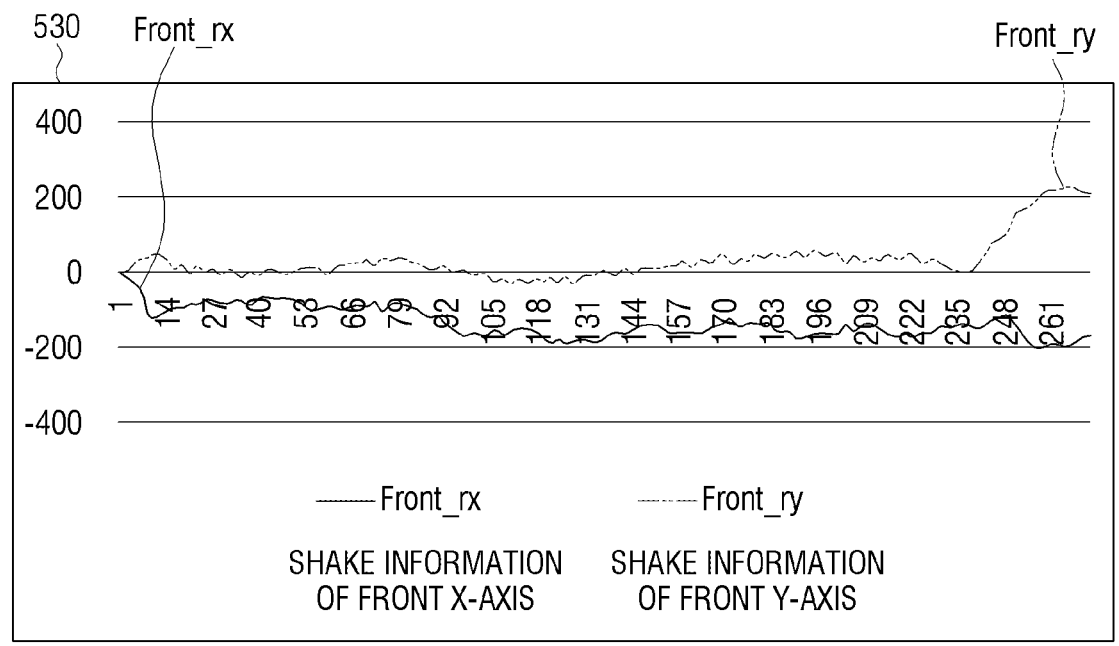
FIG. 5C is a view to describe a method for calculating a shake correction value according to an embodiment.
Figure 5C:
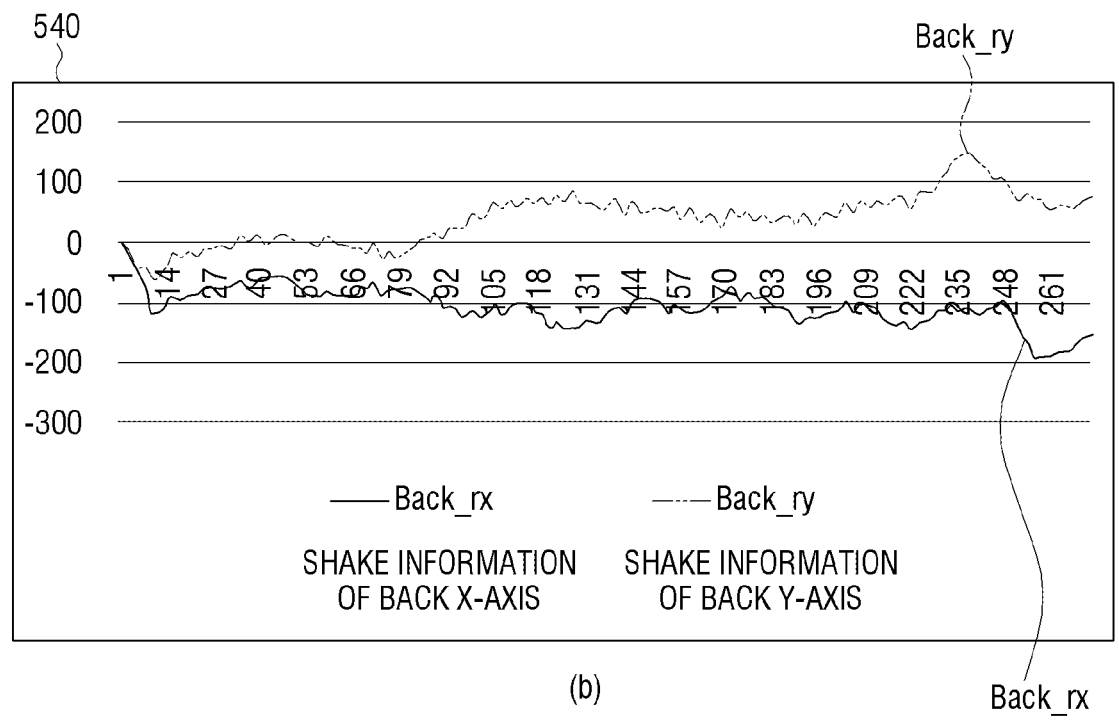

FIGS. 5B and 5C illustrate an example that the processor 120 converts shake information of the camera into two-axis shake information of the image corresponding to a front area 510 and a back area 520 of the VR image. FIG. 5B represents the camera shake information of six movement components, and FIG. 5C represents x-axis and y-axis shake information 530 of the image corresponding to the front area 510 and the x-axis and y-axis shake information 540 of the image corresponding to the back area 520, in the VR image. In the graph indicating each information, the x-axis represents the number of the image frame, and the y-axis represents the amount of change per pixel.

The processor 120 may, for example, convert the camera shake information as shown in FIG. 5B into two-axis shake information of an image corresponding to the viewing area of a user as shown in FIG. 5C using the following equation. However, the equation of converting the camera shake information of the camera into shake information of an image corresponding to the viewing area of the user is not limited thereto.

$$rx = Tx^*\sin\theta H - Tz^*\cos\theta H + Yawc^*\cos\varphi H + Rollc^*\sin\varphi H^*\sin\theta H + Pitchc^*\sin\varphi H^*\cos\theta H$$

$$ry = Ty^*\cos\varphi H - Tz^*\sin\varphi H^*\sin\theta H - Tx^*\cos\theta H^*\sin\varphi H + Pitchc^*\sin\theta H - Rollc^*\cos\theta H \quad \text{[Equation 2]}$$

Here, rx represents the x-axis shake information of the image corresponding to the viewing area of the user, ry presents the y-axis shake information of the image corresponding to the viewing area of the user, Tx represents the x-axis linear movement information of the camera 50, Ty represents the y-axis linear movement information of the camera 50, Tz represents the z-axis linear movement information of the camera 50, Yawc is yaw rotation movement information of the camera 50, Pitchc is the pitch rotation movement information of the camera 50, Rollc is the roll rotation movement information of the camera 50, θH represents the yaw coordinate of the viewing area of the user, and φH represents the pitch coordinate of the viewing area of the user.

In the meantime, in Equation 2 above, in order to convert the six movement components of the camera 50 into two-axis shake information of the image corresponding to the viewing area of a user, the roll coordinates of the viewing area of the user are set to 0°, but it is not limited thereto.

That is, according to another embodiment of the disclosure, the processor 120 may calculate the rotation shake information rθ of the image corresponding to the viewing area of the user using the roll coordinates (for example, the angle at which the viewing area of the user is rotated clockwise or counterclockwise with respect to a horizontal line) of the viewing area of the user and the movement components of the camera 50. In this case, the shake information of the camera 50 may be converted into three-axis shake information of the image corresponding to the viewing area of the user.

Referring to FIG. 5C, the same six movement information of the camera are represented to be different shake information according to viewing areas (front area and the back area in FIG. 5C) of the user.

Accordingly, the processor 120 may calculate the shake correction value using the shake information of the image corresponding to the viewing area of the user. Here, the shake information corresponding to the viewing area of the user may be the two-axis shake information or the three-axis shake information described above. Specifically, the processor 120 may calculate the shake correction value by smoothing the two-axis or three-axis shake information, calculating the difference value between the smoothed two-axis or three-axis shake information and the two-axis or three-axis shake information before smoothing, and converting the calculated difference value to a rotation value of the sphere.

According to an embodiment of the disclosure, the processor 120 may smooth the two-axis shake information by removing a high frequency component from the two-axis shake information. Specifically, the processor 120 may apply filters such as a Kalman filter and an average filter to the two-axis shake information to smooth the two-axis shake information, but the embodiment is not limited thereto.

Figure 5D:
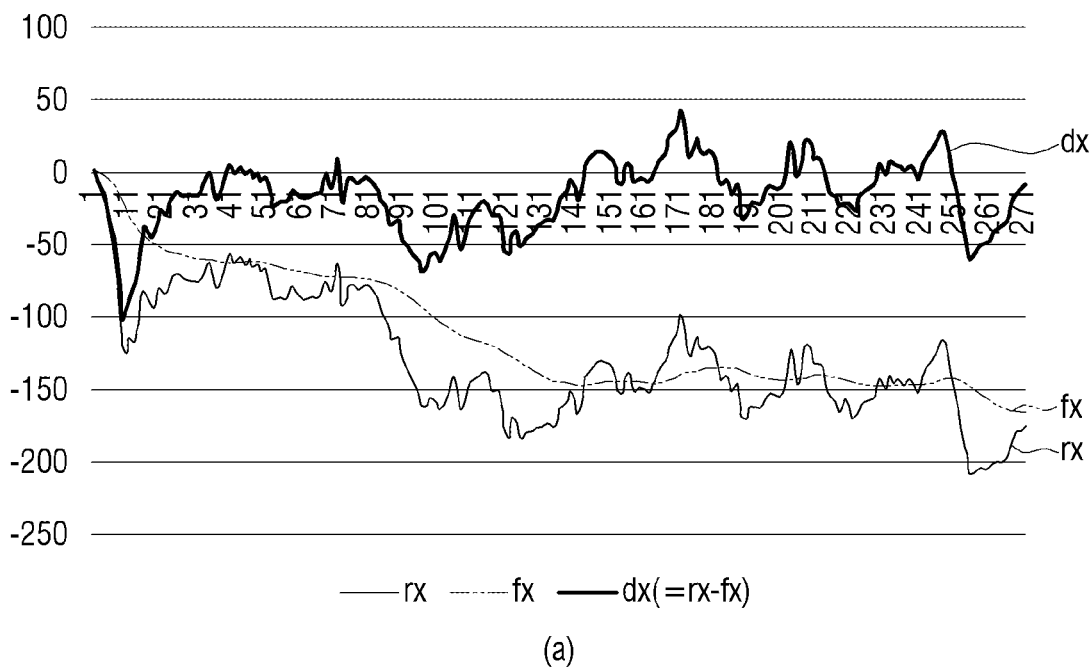
FIG. 5D is a view to describe a method for calculating a shake correction value according to an embodiment.
Figure 5D:
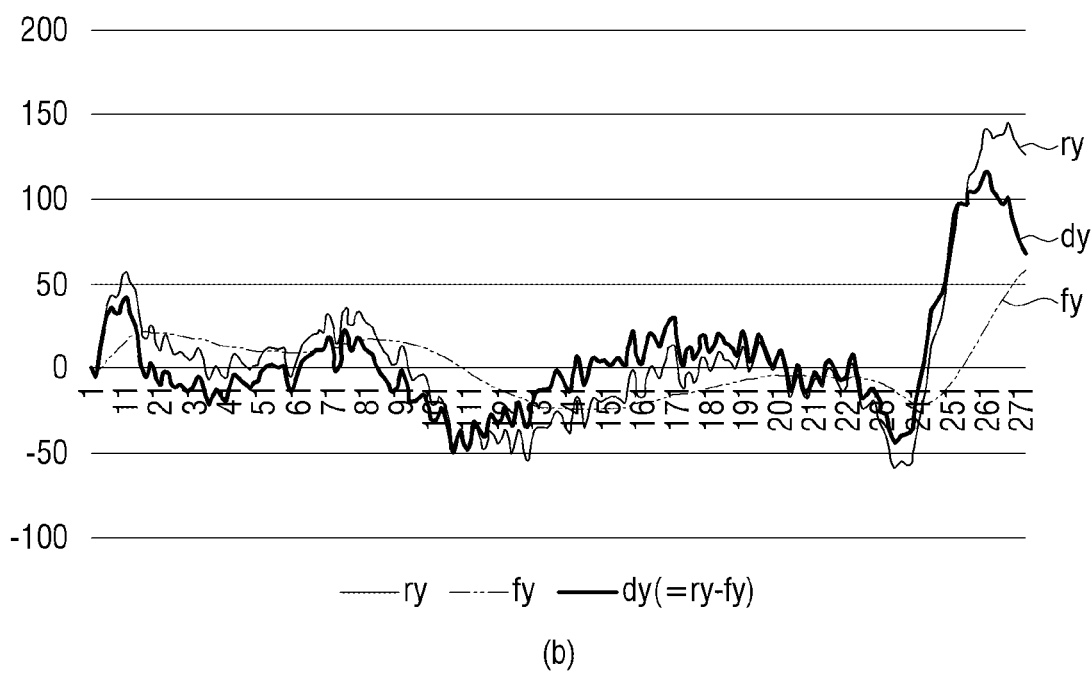

In addition, the processor 120 may calculate a difference value between the two-axis shake information before smoothing and the smoothed two-axis shake information. FIG. 5D shows an example of calculating the difference value in each of the two-axis shake information of one viewing area (for example, the front area). The graph of FIG. 5D also illustrates that the x-axis represents the number of the image frame, and the y-axis represents the amount of change per pixel.

Specifically, in FIG. 5D (A), rx represents x-axis shake information, and fx represents smoothed x-axis shake information. The processor 120 may calculate the difference value dx by subtracting the smoothed x-axis shake information value fx from the x-axis shake information value rx before smoothing for each image frame. The processor 120 may perform the same calculations on the y-axis shake information as well to calculate the difference value dy as shown in FIG. 5D (B).

In the meantime, the smoothed two-axis shake information in FIG. 5D corresponds to the intended movement (for example, when the user photographs the VR image while walking in a specific direction with holding the camera, the movement of the camera 50 according to the walking movement in the specific direction) of the user of the camera 50, and the calculated difference value (dx, dy) is the shake value of x and y axis to be corrected from the image of the ERP format, that is, shake of the camera 50. Therefore, the calculated difference value (dx, dy) will be used for adjusting the viewing area of the user which will be described later.

In the meantime, as described above, a user's viewing area is commonly expressed as coordinates of the sphere as yaw, pitch, and roll with respect to the reference point and the processor 120 may convert the calculated difference value into the rotation value on the coordinates of the sphere to correct shake of the image corresponding to the viewing area. That is, the processor 120 may convert the dx and dy values to dYaw, dPitch, and dRoll values.

For example, if the VR image is an image having a resolution of 3840*1920, the processor 120 may convert the shake value on the x, y coordinates of the ERP format image into a rotation value on the coordinates of the sphere through the Equation below. However, the following equation is only an example, and is not limited thereto.

$$dYaw = (360°/3840)^*dx$$

$$dPitch = (360°/3840)^*dy$$

$$dRoll = 0° \quad \text{[Equation 3]}$$

As such, the value converted into the rotation value of the sphere becomes the final shake correction value. The processor 120 may adjust the viewing area in the VR image based on the calculated shake correction value. Specifically, the processor 120 may adjust the viewing area by moving the viewing area by the shake correction value in the VR image.

In the meantime, as described above, the processor 120 may convert the camera shake information to the three-axis shake information rx, ry, and rθ of the image corresponding to the viewing area of the user. Therefore, according to another embodiment, the processor 120 may remove the high-frequency components by applying the Kalman filter or the average filter to the three-axis shake information to smooth the three-axis shake information, and calculate the difference value dx, dy, dθ between the three-axis shake information before smoothing and the smoothed three-axis shake information.

Accordingly, the processor 120 may calculate the three-axis shake correction value by adjusting the calculated difference value dx, dy, dθ to the rotation values dYaw, dPitch, and dRoll on the coordinates of the sphere, and adjust the viewing area of the user in the VR image using the calculated three-axis shake correction value.

Accordingly, the processor 120 may reduce shake of the image corresponding to the viewing area of the user by controlling the display 110 to display the image corresponding to the adjusted viewing area in the VR image.

Figure 6:
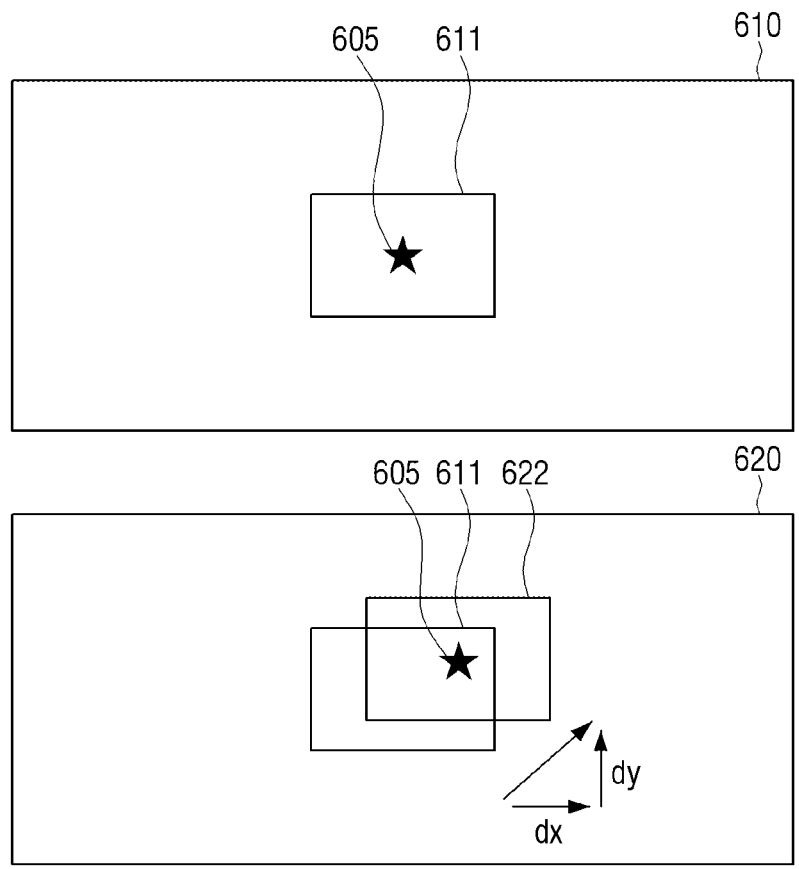
FIG. 6 is a view to describe a concept of applying the shake correction value to the VR image according to an embodiment.
Figure 6:
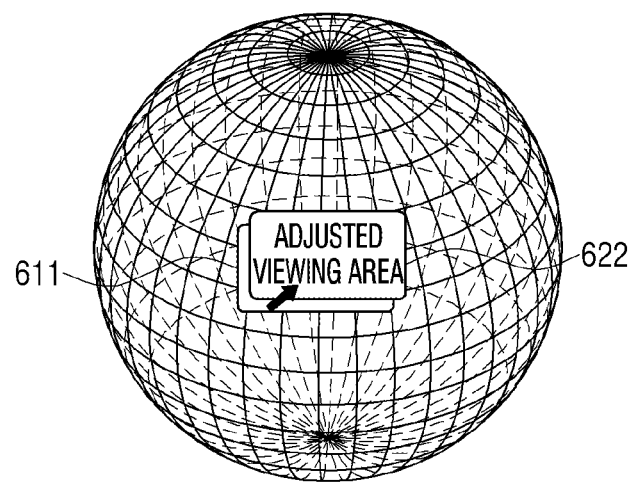

FIG. 6 is a view to describe a concept of applying the two-axis shake correction value to the VR image according to an embodiment. In FIG. 6A, reference numerals 610 and 620 represent an entire VR image frame of the ERP format, and a reference numeral 611 represents the viewing area of the user. When the user of the display apparatus 100 wears the display apparatus 100 and views the same direction without moving the head, the viewing area 611 of the user in the entire VR image is the same as illustrated, even if the image frame is changed.

However, if the VR image itself has shake due to shake of the camera photographing the VR image, or the like, even if the viewing area 611 is the same, display position of an object 605 included in the viewing area 611 may be different in the viewing area 611 due to shake, and this may cause fatigues or burdens to eyes of the user.

According to an embodiment, the viewing area is adjusted as much as the shake correction value of the image corresponding to the viewing area and the image corresponding to the adjusted viewing area 622 is displayed. Therefore, even if the VR image itself has shake due to shake of the camera photographing the VR image, the user may view the image without shake or with reduced shake.

As shown in FIG. 6A, the processor 120 first calculates x, y axis shake correction values dx and dy of the image corresponding to the viewing area of the user using an image in EPR format. However, as described above, since the viewing area of the user is determined as coordinate values of the sphere such as yaw, pitch and roll values with respect to the reference point, and the x and y axis shake correction values dx and dy are converted into rotation values on the coordinates of the sphere, and the viewing area is adjusted. FIG. 6B shows a concept of displaying an image corresponding to the adjusted viewing area by adjusting the viewing area by the rotation value converted on the coordinates of the sphere.

Meanwhile, the shake correction value descried above is a high-frequency component as illustrated in FIG. 5D and is sufficiently small in size and thus, it may be reasonable to approximate the rotation movement of the camera and the shake of the linear movement component to the rotation value of the sphere.

FIG. 6 illustrates the concept that the two-axis shake correction value is applied to the VR image for convenient description. However, those skilled in the art who understood the description of FIG. 6 may easily understand that, if the three-axis shake correction value is applied, the viewing area of the VR image may be adjusted by using the rotation shake correction value dθ, in addition to the x-axis shake correction value dx and y-axis shake correction value dy. In this case, the viewing area may be adjusted by converting dx, dy, and dθ which are the shake correction values of the image corresponding to the viewing area of the user calculated by using the image of the EPR format to dYaw, dPitch, and dRoll which are the rotation values on the coordinates of the sphere.

In the meantime, in the case of adjusting the rotation shake for a general camera image having a normal viewing angle, loss of resolution may occur in the process of trimming or cropping. However, since the VR image includes the 360-degree view, even if the rotation shake of the image is adjusted using the rotation shake information, that is, if the viewing area is adjusted, resolution is not lost. Therefore, when the shake of the VR image is adjusted by adjusting the viewing area using the three-axis shake information, more accurate shake correction may be performed without loss of resolution.

Figure 7:
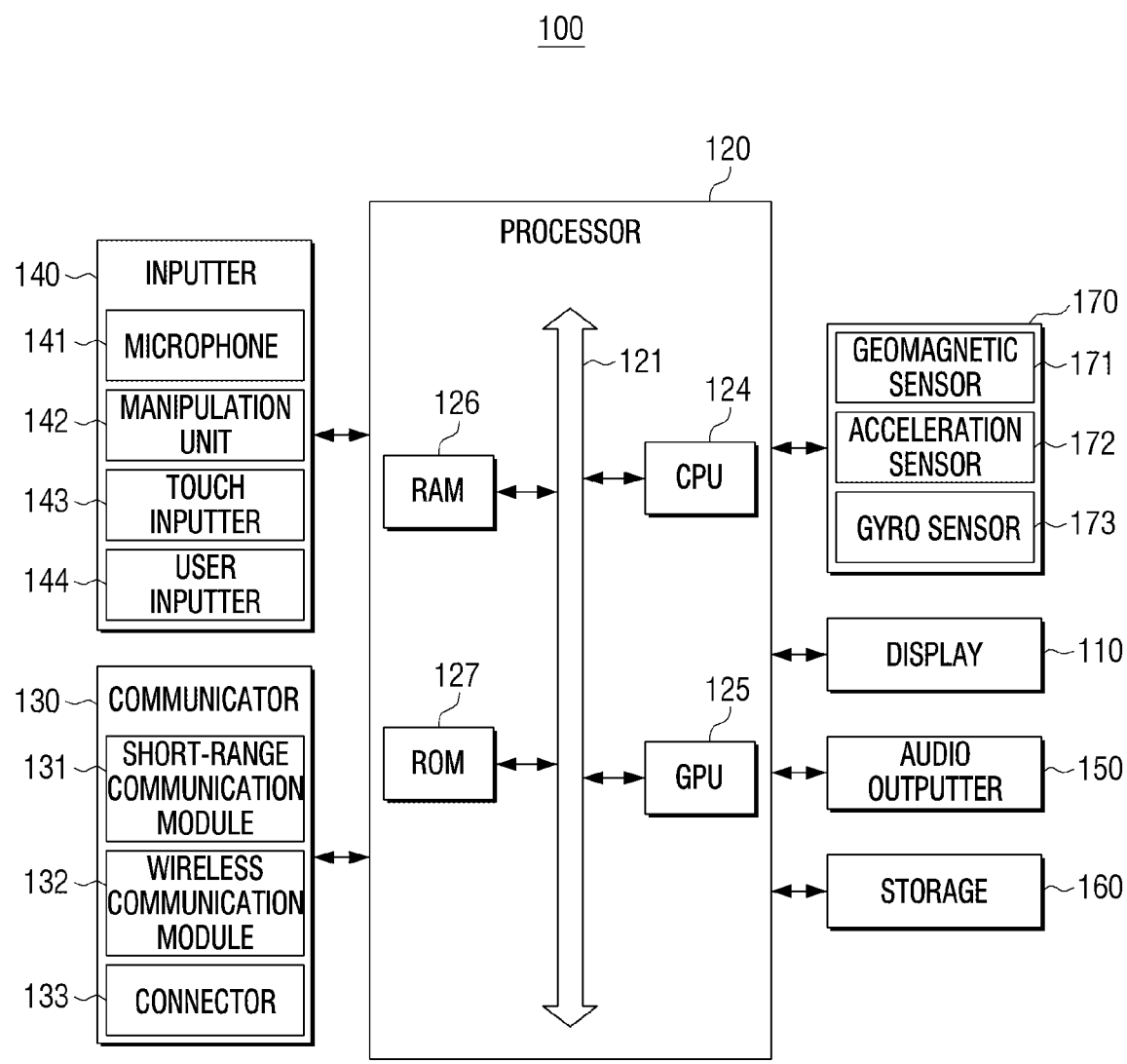
FIG. 7 is a detailed block diagram illustrating a configuration of the display apparatus according to another embodiment.

FIG. 7 is a detailed block diagram illustrating a configuration of the display apparatus according to another embodiment. In the description of FIG. 7, redundant descriptions with the same operations as described above will be omitted. According to FIG. 7, the display apparatus 100 may include the display 110, the processor 120, a communicator 130, an inputter 140, an audio outputter 150, a storage 160, and a sensor 170.

The display 110 may display various UIs under the control of the processor 120. In particular, the display 110 may display a UI for performing a shake correction mode for adjusting shake of the image corresponding to the viewing area of the user. In addition, the display 110 may display a shake correction degree adjustment UI for adjusting the extent of shake correction of the image corresponding to the viewing area of the user.

The communicator 130 may include a short-range communication module 131, a wireless communication module 132, and a connector 133. The short-range communication module 131 is a configuration to perform short-range communication without wire between the display apparatus 100 and a peripheral device (not shown). The short-range communication module 131 may include at least one of a Bluetooth module, an infrared data association (IrDA) module, a near field communication (NFC) module, a wi-Fi module, and a Zigbee module.

The wireless communication module 132 is a module that is connected to an external network and performs communication according to a wireless communication protocol such as IEEE. In addition, the wireless communication module further includes a mobile communication module for performing communication by accessing a mobile communication network according to various mobile communication standards such as 3rd generation (3G), 3rd Generation Partnership Project (3GPP), Long Term Evolution (LTE), or the like.

As such, the communicator 130 may be implemented by various short-range communication and wireless communication methods described above, and other communication technologies not mentioned herein may be employed as necessary.

The connector 133 is a configuration to provide interface with an external device in accordance with various standards such as USB 2.0, USB 3.0, HDMI, IEEE 1394, and the like.

In particular, the communicator 130 may be connected to an external terminal including a 360-degree camera photographing the VR image by various wired and wireless methods to transmit and receive VR image contents. Also, the communicator 130 may receive VR image contents from an external server. At this time, the communicator 130 may receive the VR image content by streaming. Also, the communicator 130 may receive camera shake information obtained through a sensor included in the camera.

In addition, according to an embodiment, the communicator 130 may be connected to the detachable HMD and transceive various control commands related to reproduction of the VR image contents. When various sensors for sensing the head movement of the user are included in the detachable HMD, the display apparatus 100 may receive the HMD sensor data for determining the viewing area of the user through the communicator 130.

The inputter 140 is a configuration to receive an input of various user commands and transmit the received user commands to the processor 120, and may include a microphone 141, a manipulation unit 142, a touch inputter 143, and a user inputter 144.

The microphone 141 receives a user's voice and the manipulation unit 142 may be implemented as a keypad having various function keys, numeric keys, special keys, character keys, and the like. The touch inputter 143 may be implemented as a touch screen having a mutual-layer structure with the display 110. In this case, the touch inputter 143 may receive a selection command for various application-related icons displayed through the display 110. The user inputter 144 may receive various types of wired or wireless signals for controlling the operation of the display apparatus 100 from at least one peripheral device (not shown).

The audio outputter 150 may output audio of various contents. In particular, the audio outputter 150 may output the audio data which is processed in the audio signal format in the form of an audible sound.

The storage 160 may store various programs and data. In particular, the storage 160 may store various VR images received from an external terminal or a server.

In particular, when the operation of the processor 120 described with reference to FIGS. 2 to 7 is implemented in the form of a software program, the software module may be stored. For example, the storage 160 may include a camera shake determination module (not shown) for determining the shake information of the camera photographing the VR image by analyzing a plurality of image frames constituting the VR image, a shake correction value calculation module (not shown) for calculating the shake correction value of the image corresponding to the viewing area in the VR image based on the camera shake information, and a viewing area adjustment module (not shown) for adjusting the viewing area based on the shake correction value and displaying the image corresponding to the adjusted viewing area. Accordingly, the processor 120 may read the module stored in the storage 160 and operate as described above with reference to FIGS. 2 to 7.

Further, the storage 160 may further store an operation program for controlling the operation of the display apparatus 100. Here, the operation program may be a program that is read in the storage 160 and compiled to operate each configuration of the display apparatus 100 when the display apparatus 100 is turned on.

The storage 160 may be implemented as a memory card (e.g., an SD card, a memory stick, etc.) capable of being attached to or detached from the display apparatus 100, various non-volatile memories, a volatile memory, a hard disk drive (HDD), or a solid state drive (SSD), or the like.

The movement sensor 170 is a configuration to sense a movement of the display apparatus 100. The movement sensor 170 may include at least one of a geomagnetic sensor 171, an acceleration sensor 172, and a gyro sensor 173. Various sensors included in the movement sensor 170 may sense a three-dimensional movement of the display apparatus 100 through the combination of one or at least two sensors among these sensors.

The geomagnetic sensor 171 is a sensor for measuring the azimuth. That is, the geomagnetic sensor 171 means a sensor that measures the azimuth angle by sensing a magnetic field formed in the north-south direction of the Earth. The geomagnetic sensor 171 may detect geomagnetism in three-axis direction. The north direction measured by the geomagnetic sensor 171 may be a magnetic north. However, even if the geomagnetic sensor 171 measures the direction of the magnetic north, it is also possible to output the direction of the true north through an internal operation.

The acceleration sensor 172 is a sensor for measuring the spatial movement of the display apparatus 100. That is, the acceleration sensor 172 refers to a sensor that senses a change in acceleration and/or a change in angular acceleration that occurs when the display apparatus 100 moves. The acceleration sensor 172 may sense acceleration in three-axis direction. In addition, the acceleration sensor 172 may sense the tilt of the display apparatus 100.

The gyro sensor 173 is an inertia sensor for measuring the rotational angular speed of the display apparatus 100. That is, the gyro sensor means a sensor for identifying a current direction using inertia of a rotating object. The gyro sensor 173 may measure the rotational angular speed in a two-axis direction.

In particular, the movement sensor 170 may recognize a direction in which the display apparatus 100 moves, rotational angular speed, or the like, while the user wears the display apparatus 100, and provide the data to the processor 120. Accordingly, the processor 120 may determine a viewing direction of the user in the displayed VR image.

Though not illustrated, the display apparatus 100 may further include a gravity sensor for detecting a direction in which gravity acts, a pupil tracking sensor for detecting a change in the user's gaze, a proximity sensor for detecting whether an object is close to another object before being in contact with each other.

The processor 120 may include a central processing unit (CPU) 124, a graphics processing unit (GPU) 125, random-access memory 126, and a read-only memory 127. The CPU 124, GPU 125, RAM 126, and ROM 127 may be interconnected through a bus 121.

The CPU 124 accesses the storage 160 and performs booting using operating system stored in the storage 160. The CPU 124 performs various operations using various programs, contents, data, or the like stored in the storage 160.

The GPU 125 generates a display screen that includes various objects such as icons, images, texts, and the like. Specifically, the GPU 125 calculates an attribute value such as a coordinate value, a shape, a size, and a color to be displayed by each object according to the layout of the screen based on the received control command, and generates a display screen of various layouts including the object, based on the calculated attribute value.

The ROM 126 stores a command set and the like for booting the system. When the turn-on command is input and power is supplied, the CPU 124 copies the OS stored in the storage 160 to the RAM 126 according to the instruction stored in the ROM 125, and executes the OS to boot the system. When the booting is completed, the CPU 124 copies various programs stored in the storage 160 to the RAM 126, executes the program copied to the RAM 126, and performs various operations.

The processor 120 may be implemented as a system-on-a-chip or system on chip (SOC, SoC), in combination with the components described above.

The processor 120 may control the display 110 to display the VR image stored in the storage 160 or a VR image streamed through the communicator 130 according to a user command through the inputter 140. When the VR image is displayed, the processor 120 may reduce shake of the displayed VR image by calculating the shake correction value of the image corresponding to the viewing area as described above, adjusting the viewing area according to the calculated shake correction value, and displaying the image corresponding to the adjusted viewing area.

According to an embodiment, the processor 120 may use shake information which is obtained through a sensor included in the camera which photographs the VR image.

Specifically, there may be a case where a sensor for detecting shaking is included in a 360-degree camera for photographing a VR image. In this case, the camera may detect the shake of the camera occurring while photographing the VR image, and obtain various shake information such as movement information in the x-axis direction of the camera, movement information in the y-axis direction, movement information in the z-axis direction, yaw rotation movement information, pitch rotation movement information, and roll rotation movement information.

In this case, since the camera may provide not only the photographed VR image but also shake information at the time of photographing the VR image, the processor 120 may receive the shake information of the camera provided from the camera through the communicator 130, and perform the operations described above with reference to FIGS. 2 to 6 using the received shake information.

According to another embodiment, the processor 120 may determine the shake information of the camera by using the result of analyzing the plurality of frames included in the VR image and the shake information of the camera acquired through the sensor included in the camera.

For example, the processor 120 may determine the shake information of the camera using six movement information of the camera, of which a part is obtained through the sensor included in the camera, and a remainder is obtained through a result of analyzing the VR image.

Also, even if the movement information of the camera obtained through a sensor included in the camera is provided, the camera shake information may be determined by averaging the movement information of the camera obtained through the sensor with the camera movement information obtained through the VR image analysis or combining the movement information of the camera obtained through the sensor and the camera movement information obtained through the VR image analysis with different weights.

As such, a method of using by the processor 130 the VR image analysis result and the shake information obtained through a sensor included in the camera has no limitation.

According to one embodiment, the processor 120 may control the display 110 to display a UI for performing a shake correction mode for correcting shake of an image corresponding to the viewing area of the user. Accordingly, when the shaking correction mode is executed, the processor 120 may calculate a shake correction value.

In other words, according to one embodiment, the processor 120 may store the camera shake information of the camera photographing the VR image in the storage 160 by analyzing the VR image in advance. The shake correction value may be calculated only when the user's viewing area is determined. Therefore, when the user executes the shake correction mode through the UI and views the VR image, the shake correction value may be calculated.

The embodiment is not limited thereto, and according to some embodiments, when the user wears the display apparatus 100 and views the VR image, the shake correction value of the image corresponding to the camera shake information and the viewing area may be calculated.

Figure 8:
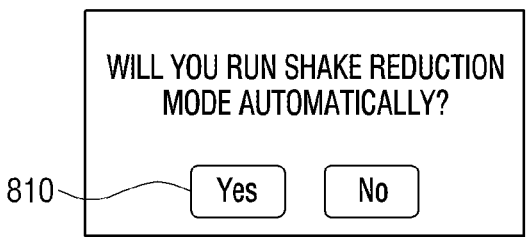
FIG. 8 is an exemplary view of a UI screen according to an embodiment.
Figure 8:
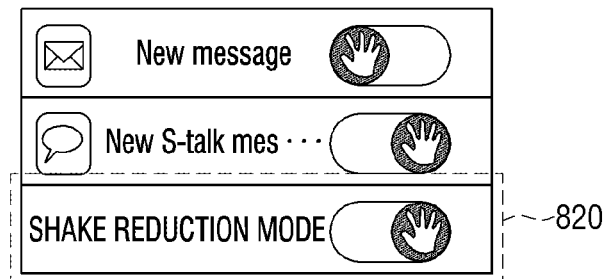
Figure 8:
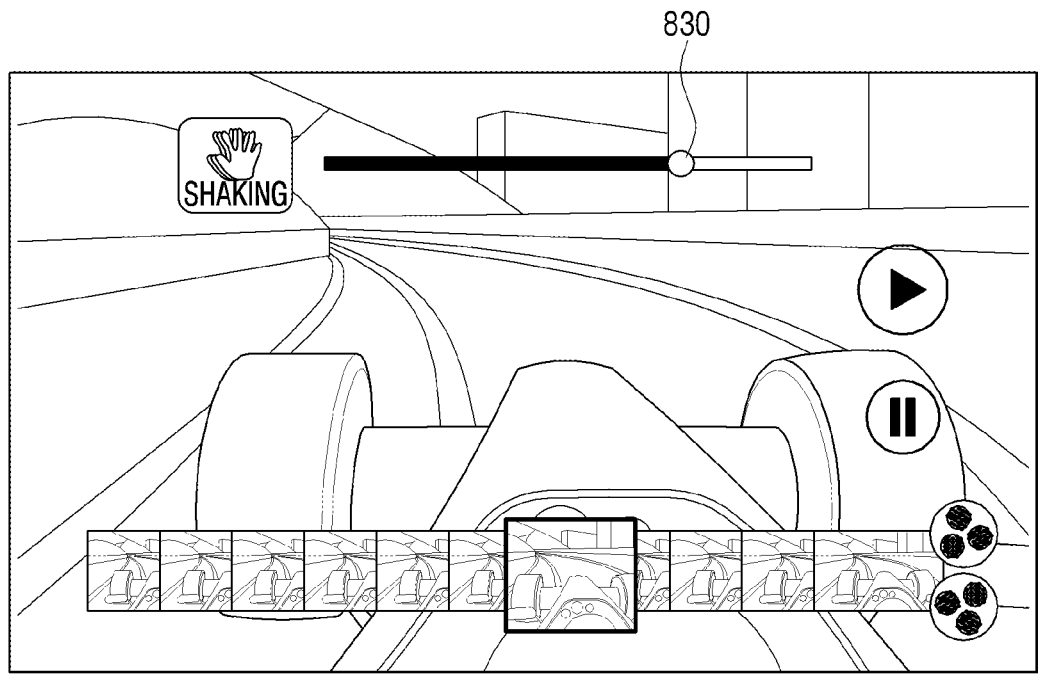

FIGS. 8A and 8B illustrate an example of a UI for executing a shake correction mode. Before viewing the VR image, the user may select Yes 810 in the UI of FIG. 8A or set so that the shake correction mode is to be selected in the UI of FIG. 8B, and view the image with reduced shake, when viewing the VR image through the display apparatus 100.

According to another embodiment, the processor 120 may control the display 110 to display a UI for adjusting the shake correction degree to adjust shake correction degree of the image corresponding to the viewing area of the user.

When there is a user manipulation through the shake correction degree adjustment UI, the processor 120 may adjust shake correction degree by adjusting smoothing intensity of the shake information of the image corresponding to the viewing area of the user.

As described above, since various kinds of filters such as a Kalman filter are applied to remove the high-frequency components, the two-axis shake information or the three-axis shake information is smoothed. Therefore, the processor 120 may adjust the application intensity of the filter, and adjust the smoothing intensity of the two-axis shake information or the three-axis shake information.

For example, in the example of FIG. 5D, when smoothing is strongly performed by removing a large amount of high-frequency components, the difference value between the x-axis shake information before smoothing and the smoothed x-axis shake information, and the difference value between the y-axis shake correction value before smoothing and the smoothed y-axis shake information becomes large, each shake correction value dx, and dy become large. When the smoothing is weakened, the difference value becomes small before and after the smoothing and thus, the shake correction value dx, dy may become smaller.

In the meantime, in the case of smoothing the three-axis shake information, when the smoothing is strongly performed, the difference values of the before and after smoothing of the x-axis, the y-axis and the rotation shake information become large, and the shake correction values dx, dy, dθ become large. When the smoothing is performed to be weak, the difference value becomes smaller, and the shake correction values dx, dy, dθ become smaller.

Accordingly, the processor 120 may adjust the viewing area of the user based on the shake correction value and thus, the shake correction degree may be adjusted through adjustment of the smoothing intensity of the shake information of the image.

FIG. 8C illustrates an example of a UI for adjusting shake correction degree. When the user adjusts the shake correction degree by manipulating a shake correction degree adjustment UI 830, the processor 120 may adjust the shake correction degree by adjusting the smoothing intensity to correspond thereto.

Figure 9:
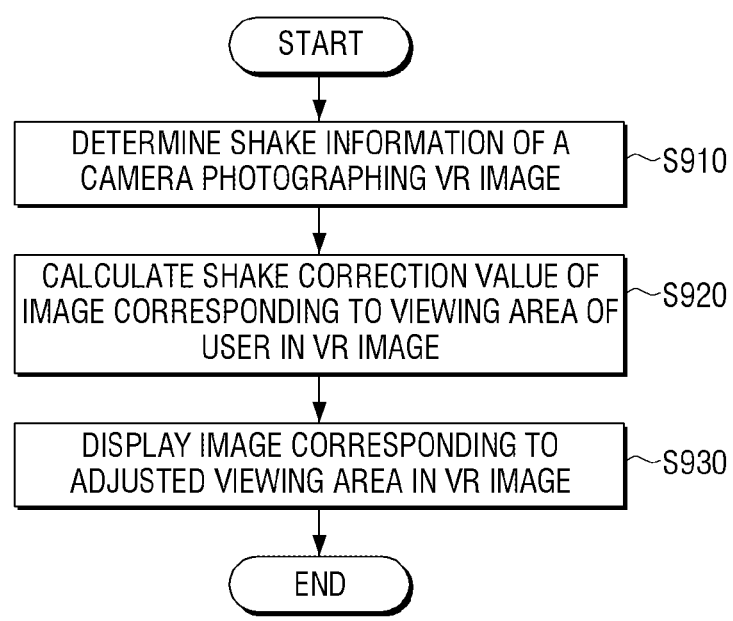
FIG. 9 is a flowchart to describe an image processing method of the display apparatus according to an embodiment.

FIG. 9 is a flowchart to describe an image processing method of the display apparatus according to an embodiment. According to FIG. 9, the display apparatus 100 may analyze a plurality of image frames constituting the VR image and determine camera shake information photographing the VR image in step S910.

Specifically, the display apparatus 100 may divide each of a plurality of image frames into a plurality of areas, detect the feature points in each area corresponding to each other in the plurality of image frames, and determine camera shake information based on the detected changes in the feature points.

The display apparatus 100 may determine shake information by using both the analysis result of the plurality of image frames and shake information acquired through a sensor included in the camera.

Here, the camera shake information may include at least one of movement information of the camera in an x-axis direction, movement information in the y-axis direction, movement information in the z-axis direction, yaw rotation movement information, pitch rotation movement information, and roll rotation movement information with respect to a preset direction.

Accordingly, the display apparatus 100 may calculate the shake correction value of the image corresponding to the viewing area of the user from the VR image based on the camera shake information in step S920.

Specifically, the display apparatus 100 may convert the camera shake information into shake information of an image corresponding to the viewing area based on the movement state of the display apparatus for determining the viewing area, and calculate the shake correction value by using the shake information of the image corresponding to the viewing area.

More specifically, the display apparatus 100 may calculate a shake correction value by smoothing shake information of an image, calculating a difference value between shake information of the image before smoothing and smoothed shake information of the image, and converting the calculated difference value to a rotation value of a sphere.

Here, the shake information of the image may be two-axis shake information which includes x-axis shake information and the y-axis shake information of the image corresponding to the viewing area or three-axis shake information including the x-axis shake information, y-axis shake information, and rotation shake information of the image corresponding to the viewing area.

Accordingly, the display apparatus 100 may adjust the viewing area based on the calculated shake correction value and display the image corresponding to the adjusted viewing area in the VR image in step S930.

Specifically, the display apparatus 100 may adjust the viewing area by moving the viewing area in the VR image as much as the shake correction value and display the image corresponding to the moved viewing area.

According to one embodiment of the disclosure, the display apparatus 100 may display a UI for executing the shake correction mode to correct shake of the image corresponding to the viewing area of the user. Accordingly, when the shake correction mode is executed, the display apparatus 100 may calculated the shake correction value.

In the meantime, according to another embodiment, the display apparatus 100 may display a UI for adjusting shake correction degree to adjust shake correction degree of the image corresponding to the viewing area of the user. Accordingly, the display apparatus 100 may adjust the shake correction degree in the VR image by adjusting smoothing intensity of the shake information of the image according to a user manipulation through the UI for adjusting shake correction degree.

According to various embodiments, the display apparatus may display the VR image with reduced shake.

Specifically, according to various embodiments of the disclosure, an input VR image of an ERP format can be used as it is instead of converting, and thus, even in the case of displaying the VR image as streaming, the image with reduced shake may be displayed.

The shake may be reduced in consideration of not only rotational movement of the camera photographing the VR image but also linear movements in x, y, and z axis directions.

The input VR image is not converted and thus, a user may adjust shake correction degree, and on and off of the shake correction function is available.

According to various embodiments, the operation of a processor of a display apparatus or the operation of a processor of a display apparatus may be generated in software and mounted on the display apparatus.

A non-transitory computer readable medium storing a program to perform, for example, the method may include analyzing a plurality of image frames constituting the VR image to determine shake information of the camera photographing the VR image, calculating shake information correction value of the image corresponding to the viewing area in the VR image based on the camera shake information, adjusting the viewing area based on the shake correction value, and displaying an image corresponding to the viewing area adjusted in the VR image may be installed.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The above description is merely illustrative of the technical idea of the disclosure, and it will be understood by those of ordinary skill in the art that various changes in form and details may be made therein without departing from the spirit and scope of the disclosure. In addition, the embodiments disclosed herein are not intended to limit the scope of the disclosure but to describe the technical spirit of the disclosure, and the scope of the technical spirit of the disclosure is not limited by the embodiments. Therefore, the scope of the disclosure is to be construed according to the following claims, and all the technical spirits within the equivalent scope is within the scope of the appended claims.

What is claimed is:

1. An image processing method of a display apparatus, the method comprising:
   determining shake information of a camera which photographs a virtual reality (VR) image by analyzing a plurality of image frames constituting the VR image;
   converting the shake information of the camera into shake information of an image corresponding to a viewing area of a user in the VR image based on a movement state of the display apparatus which determines the viewing area;
   smoothing the shake information of the image;
   calculating a difference value between the shake information of the image and the smoothed shake information of the image;
   calculating a shake correction value of the image by converting the difference value to a rotation value of a sphere;

adjusting the viewing area based on the shake correction value; and displaying an image corresponding to the adjusted viewing area in the VR image.

2. The method of claim 1, wherein the determining shake information of a camera comprises:

dividing each of the plurality of image frames into a plurality of areas and detecting feature points by areas which correspond to each other in the plurality of image frames; and determining shake information of the camera based on a change amount between the detected feature points.

3. The method of claim 1, wherein the shake information of the camera comprises at least one of movement information of the camera in an X-axis, movement information in a Y-axis, movement information in a Z-axis, yaw rotation movement information, pitch rotation movement information, and roll rotation movement information, with respect to a preset direction.

4. The method of claim 1, wherein the shake information of the image is two-axis shake information including x-axis shake information and y-axis shake information corresponding to the viewing area or three-axis shake information including x-axis shake information, y-axis shake information, and rotation shake information of the image corresponding to the viewing area.

5. The method of claim 1, wherein the displaying comprises adjusting the viewing area by moving the viewing area as much as the shake correction value in the VR image, and displaying the image corresponding to the moved viewing area.

6. The method of claim 1, wherein the determining the shake information comprises determining the shake information using an analysis result of the plurality of image frames and shake information obtained through a sensor included in the camera.

7. The method of claim 1, further comprising:

displaying a UI for executing a shake correction mode to correct shake of the image corresponding to the viewing area of the user, wherein the calculating the shake correction value comprises, based on the shake correction mode being executed, calculating the shake correction value.

8. The method of claim 1, further comprising:

displaying a UI for adjusting a shake correction degree to adjust shake correction degree of the image corresponding to the viewing area of the user, wherein the smoothing comprises adjusting a smoothing intensity of shake information of the image according to a user manipulation through the UI for adjusting a shake correction degree.

9. A display apparatus comprising:

a display configured to display an image corresponding to a viewing area of a user in a VR image; and a processor configured to:

determine shake information of a camera which photographs a virtual reality (VR) image by analyzing a plurality of image frames constituting the VR image, convert the shake information of the camera into shake information of an image corresponding to a viewing area of a user in the VR image based on a movement state of the display apparatus which determines the viewing area, smooth the shake information of the image;

calculate a difference value between the shake information of the image and the smoothed shake information of the image;

calculate a shake correction value of the image by converting the difference value to a rotation value of a sphere, adjust the viewing area based on the shake correction value, and control the display an image corresponding to the adjusted viewing area in the VR image.

10. The display apparatus of claim 9, wherein the processor divides each of the plurality of image frames into a plurality of areas, detects feature points by areas which correspond to each other in the plurality of image frames, and determines shake information of the camera based on a change amount between the detected feature points.

11. The display apparatus of claim 9, wherein the shake information of the camera comprises at least one of movement information of the camera in an X-axis, movement information in a Y-axis, movement information in a Z-axis, yaw rotation movement information, pitch rotation movement information, and roll rotation movement information, with respect to a preset direction.

* * * * *